United States Patent [19]

Yokota et al.

[11] 4,268,868
[45] May 19, 1981

[54] BEAM SCANNING TYPE ELECTRONIC COPYING APPARATUS

[75] Inventors: Tsuneshi Yokota, Kawasaki; Toshio Ike, Kamakura, both of Japan

[73] Assignee: Shibaura Denki Kabushiki Kaisha, Kawasaki, Japan

[21] Appl. No.: 117,834

[22] Filed: Jan. 30, 1980

[30] Foreign Application Priority Data

Feb. 5, 1979 [JP] Japan ................................. 54-12062

[51] Int. Cl.³ ............................................. H04N 1/04
[52] U.S. Cl. .................................... 358/286; 358/285
[58] Field of Search ............... 358/201, 285, 286, 293, 358/294, 296; 350/96.13, 355, 358

[56] References Cited

U.S. PATENT DOCUMENTS

| | | | |
|---|---|---|---|
| 3,055,258 | 9/1962 | Hurvitz | 358/201 |
| 3,997,722 | 12/1976 | Bardos | 358/285 |
| 4,122,462 | 10/1978 | Hirayama et al. | 358/285 |

FOREIGN PATENT DOCUMENTS 52-15331  2/1977  Japan ................................ 358/286

Primary Examiner—Joseph A. Orsino, Jr.
Attorney, Agent, or Firm—Cushman, Darby & Cushman

[57] ABSTRACT

A beam scanning type electronic copying apparatus is provided in which document information is read out according to a beam reflected based on a scanning laser beam, the laser beam is modulated according to the document information and a record medium is exposed while being scanned. The laser beam scans the document and record medium simultaneously through an aconstooptic element which permits simultaneous beam diffraction and beam modulation. The readout of the document information and recording are simultaneously effected using the same optical system.

3 Claims, 1 Drawing Figure

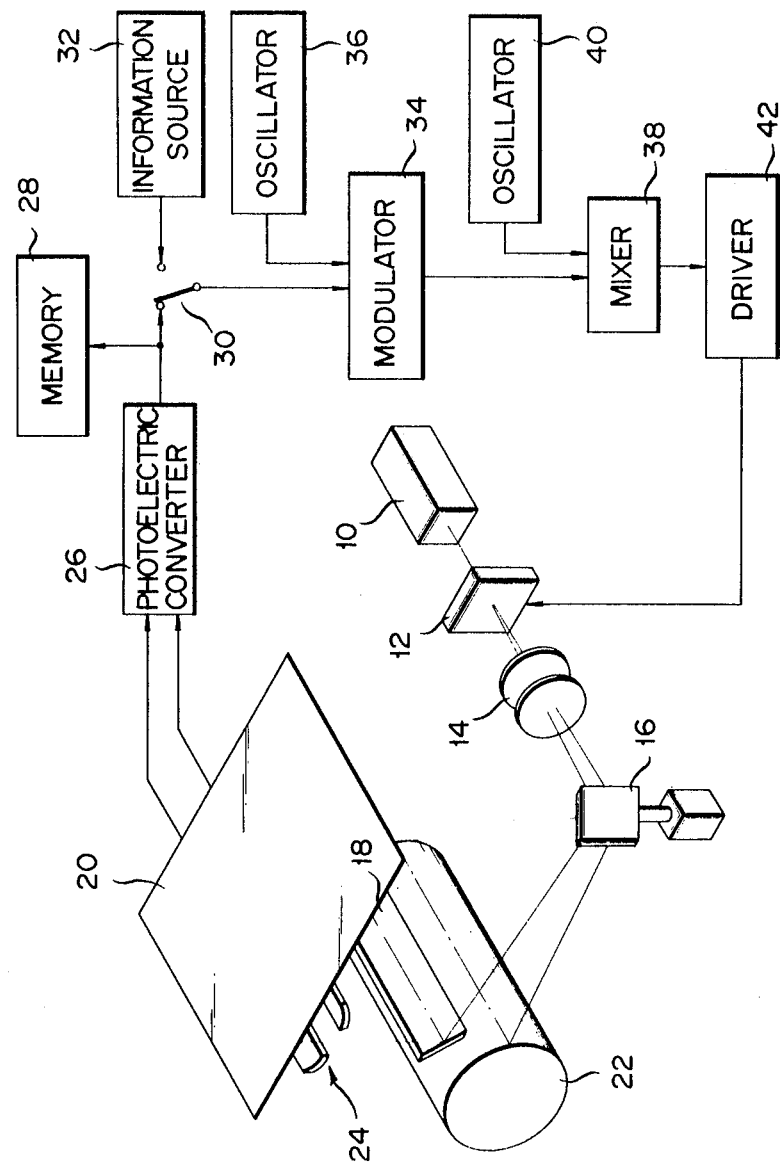

BEAM SCANNING TYPE ELECTRONIC COPYING APPARATUS

BACKGROUND OF THE INVENTION

This invention relates to a beam scanning type electronic copying apparatus for reading out document information by a scanning laser beam and recording the readout document information onto a photosensitive paper.

A conventional beam scanning type electronic copying apparatus scans a document by a laser beam, detects a beam reflected from the document according to the presence and absence of picture elements on the document and reads out the document information by an electrical signal which is photoelectrically converted from the reflected beam. The laser beam is light-modulated according to the readout electrical signal, a photosensitive recording medium is scanned by the modulated laser beam, and the document information is recorded on the photosensitive recording medium. Since such conventional apparatus effects readout of the document information and exposure of the photosensitive recording medium using the same optical system, both the operations can not be simultaneously effected. The readout information obtained by scanning the document by a laser beam is once stored in a buffer memory called "a page memory". When the scanning of one page of the document is completed the document information stored in the page memory is sequentially read out. The laser beam is light-modulated according to the readout information and the photosensitive recording medium is exposed. For this reason, the conventional apparatus is slow in copying speed and requires a large-capacity memory for storing the readout information corresponding to one page of the document, making the apparatus expensive. Where an optical system for document readout and optical system for recording are separately provided, the apparatus becomes bulkier and more expensive.

SUMMARY OF THE INVENTION

It is accordingly an object of this invention to provide a beam scanning type electronic copying apparatus which can effect simultaneous readout of document information and recording of the readout information using the same optical system.

To attain this object, a beam scanning type electronic copying apparatus is provided which comprises light source for generating a light beam, light beam modulating means for dividing the first order beam of the light beam from the light source into first and second diffracted beams according to the frequencies of a drive signal including a plurality of frequency components and for modulating the light beam according to the drive signal, means for scanning the document by the first diffracted beams from the light beam modulating means and the recording medium by the second diffracted beams, photoelectrical converting means for converting a beam reflected from a document based on the first diffracted beam into an electrical signal, means for amplitude modulating a first signal of a predetermined frequency according to the electrical signal from the photoelectrical converting means, and means for mixing an output signal of the amplitude modulating means and a second constant-amplitude signal of a predetermined frequency for supply to the light beam modulating means.

BRIEF DESCRIPTION OF THE DRAWING

Drawing shows a beam scanning type electronic copying apparatus according to one embodiment of this invention.

DETAILED DESCRIPTION OF THE PREFERRED EMBODIMENT

The drawing shows a beam scanning type electronic copying apparatus according to the embodiment of this invention.

A laser beam from a laser beam source 10 is diffracted through an acousto-optic element 12. Here it is assumed that two drive signals of different frequencies are supplied to the accousto-optic element 12 such that they are superposed one over the other. By so doing, two diffracted beams are obtained from the acousto-optic element 12. These diffracted beams are incident onto a beam scanner 16 through a lens system 14. The beam scanner 16, though shown as a galvano-mirror which is rotated only through a predetermined angle, may be replaced by a rotary multi-faced mirror. A first diffracted beam is directed onto a document 20 through a mirror 18 and a second diffracted beam is directed directly onto a photosensitive record medium 22. The document 20 is placed on a document glass, not shown with its face down as in the case of a normal copying apparatus. That is, the face of the document is illuminated from below. A light receiving section 24 is disposed below the document glass to receive a beam reflected on the document 20. The light receiving section 24 comprises two parallel arrays such that their light receiving elements are arranged in a linear fashion. The beam scanner 16 effects a beam scanning in a linear fashion. When the one diffracted beam completes a scanning over that document portion corresponding to one line of the document, the mirror 18 and light receiving section 24 are rotated by a drive mechanism (not shown) in a direction perpendicular to the scanning direction of the document 20 such that they are moved an amount corresponding to one line of the document. At the next operation of the light scanner the next line of the document 20 is scanned. In this way, the document 20 is sequentially scanned. Alternatively, the document 20 may be moved in a direction perpendicular to the scanning direction of the document with the mirror 18 and light receiving section 24 fixed, while in interlock with the rotation of the beam scanner 16. The photosensitive record medium 22 is also scanned by the beam scanner 16 line by line. The photosensitive record medium 22 is formed of a photosensitive drum and rotated according to the operation of the light scanner 16. The photosensitive drum 22 is exposed line by line to form an electrostatic latent image thereon. The latent image is transferred to a recording paper for recording. The photosensitive recording medium 22 is formed of a roll-like photosensitive paper and may be directly exposed. The output of the light receiving section 24 is supplied to a photoelectric converter 26 to convert into an electrical signal. The output signal of a photoelectric converter 26 is supplied to a memory 28 and a first movable contact of a switch 30. A second movable contact of the switch 30 is connected to an external information source 32. A signal on the fixed contact of the switch 30 is fed to an amplitude modulator 34. An output signal of an oscillator 36 of an oscillation frequency of 50 MHz is supplied as a carrier to the amplitude modulator 34. An output signal of the amplitude modulator 34 is supplied to one input terminal of a mixer 38 and an output signal of an oscillator 40 of an oscillation frequency 30 MHz is supplied to the other input terminal of the mixer 38. The mixer 38 may be of a normal type in which both signal lines are connected merely through a resistor. An output signal of the mixer 38 is supplied to the above-mentioned acousto-optic element 12 through a driver 42 such as a power amplifier. The driver 42 has such a characteristic that a gain over a frequency band range (in this embodiment 30 to 50 MHz) of the drive signal is substantially constant.

The operation of this embodiment will be explained below. When the acousto-optic element 12 is driven by a drive signal of a certain frequency, an ultrasonic wave of this frequency is excited in the element 12 and the refractive index of the element is periodically varied by the frequency of the ultrasonic wave. As a result, the element 12 acts as a diffraction grating for generating a multiple beam. The cycle of a change of the refractive index corresponds to the frequency of the drive signal. In this embodiment, the output signals of the oscillators 36 and 40 are different in their frequency. Since both the signals are supplied to the element 12 in a manner to be superposed one over the other, the laser beam is diffracted according to the oscillation frequencies of the oscillators 40 and 36 to obtain first and second diffracted beams. The oscillation frequency of the oscillator 40 is selected such that the first diffracted beam obtained thereby is illuminated by the beam scanner 16 onto the mirror 18. The oscillation frequency of the oscillator 36 is selected such that the second diffracted beam obtained thereby is illuminated by the beam scanner 16 onto the photosensitive recording medium 22. Since the output signal of the oscillator 40 has a constant amplitude the intensity of the laser beam to be scanned on the document is constant. A beam reflected from the document 20 corresponds to a black or white picture element of the document. Since the laser beam is focused to have a very small diameter, the laser beam to be illuminated on the document 20 is scattered. For this reason, the light receiving arrays are arranged one at each side of a scanning line. The received beam obtained in this way is converted into an electrical signal by the converter 26, as document information corresponding to each picture element on the scanning line of the document and read out. Now suppose that the switch 30 is thrown on the first movable contact side. In this case, the readout document information is supplied to the amplitude modulator 34 where the output signal of the oscillator 36 is amplitude modulated. The laser beam to be scanned on the photosensitive recording medium 22 is intensity modulated according to the document information. That is, the photosensitive drum 22 is exposed according to the information of the document and an electrostatic latent image is formed on the photosensitive drum 22. The latent image is copied on the recording paper through development, transfer, fixing step etc. as in the process of a known electronic copying apparatus.

In this embodiment, use is made of an acousto-optic element which can diffract an incident laser beam according to the frequency of the drive signal. A first diffracted beam produced according to a first constant-amptulude drive signal of a predetermined frequency is illuminated on the document and a second diffracted beam produced from a second drive signal of a predetermined frequency which is amplitude modulated according to an amount of light (i.e. diffracted light) reflected on the document is illuminated on the recording medium. By so doing, the readout and recording of the document can be simultaneously effected using the same optical system, obviating the necessity of providing a page memory and permitting a higher copying speed as well as the reduction of a cost.

Since the readout document information is also supplied to the memory 28 the copying of the document and storage of the document information can be simultaneously effected. The memory 28 is not necessarily required and provided merely for the purpose of extending the function. If the switch 30 is thrown on the second movable contact side the readout document information can be stored in the memory 28 and the actual recording be effected based on the record information supplied from the external record information source 32. The readout and recording of the document can be effected not only on a line-by-line basis, but also several lines at a time using a plurality of oscillators and of amplitude modulators. As a scanning beam use is made of not only a laser beam, but also a very fine light beam.

What we claim is:

1. A beam scanning type electronic copying apparatus comprising:
   a light source for generating a light beam;
   light beam modulating means for dividing the first order beam of the light beam generated from the light source into first and second diffracted beams according to the frequencies of a drive signal which includes a plurality of frequency components and for modulating the first and second diffracted beams according to the drive signal;
   means for scanning the first and second diffracted beams from said light beam modulating means onto a document and recording medium, respectively;
   photoelectric converting means for converting a beam reflected from the document based on said first diffracted beam into an electrical signal;
   first and second signal generating means for generating first and second constant-amplitude signals of predetermined frequencies;
   means for amplitude modulating the first constant-amplitude signal according to the electrical signal from said photoelectrical converting means; and
   means for mixing an output signal of said amplitude modulating means and said second constant-amplitude signal and for supplying a mixed signal as a drive signal to said light beam modulating means.

2. A beam scanning type electronic copying apparatus according to claim 1, further including means for storing said electrical signal from said photoelectric converting means.

3. A beam scanning type electronic copying apparatus according to claim 1, in which said photoelectric converting means is connected through a first movable contact of a switching means to said amplitude modulating means and a second movable contact of said switching means is connected to an external memory information source.

* * * * *